US 009779322B1

(12) United States Patent
Delachanal (10) Patent No.: US 9,779,322 B1
(45) Date of Patent: Oct. 3, 2017

(54) SYSTEMS AND METHODS FOR GENERATING STEREOGRAPHIC PROJECTION CONTENT

(71) Applicant: GOPRO, INC., San Mateo, CA (US)

(72) Inventor: Christophe Delachanal, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/094,976

(22) Filed: Apr. 8, 2016

(51) Int. Cl.
| G06K 9/20 | (2006.01) |
| G06K 9/46 | (2006.01) |
| G06T 7/00 | (2017.01) |
| G06T 7/40 | (2017.01) |
| H04N 5/232 | (2006.01) |
| H04N 9/04 | (2006.01) |

(52) U.S. Cl.
CPC .......... G06K 9/4609 (2013.01); G06T 7/0083 (2013.01); G06T 7/408 (2013.01); H04N 5/23238 (2013.01); H04N 9/04 (2013.01); G06T 2207/10016 (2013.01); G06T 2207/20212 (2013.01)

(58) Field of Classification Search
CPC .... H04N 5/23238; H04N 9/04; G06K 9/4609; G06T 7/0083; G06T 7/408; G06T 2207/10016; G06T 2207/20212
See application file for complete search history.

(56) References Cited

U.S. PATENT DOCUMENTS

| 6,243,099 | B1 * | 6/2001 | Oxaal ........................ 345/419 |
| 9,264,598 | B1 * | 2/2016 | Baldwin ............ H04N 5/23203 |
| 9,609,212 | B2 * | 3/2017 | Takenaka ............... H04N 1/387 |
| 2008/0074500 | A1 * | 3/2008 | Chen .................... G06T 3/0018 348/207.1 |
| 2009/0010567 | A1 * | 1/2009 | Akiba ....................... B60R 1/00 382/298 |
| 2010/0097444 | A1 * | 4/2010 | Lablans ................. G03B 35/00 348/46 |
| 2011/0063421 | A1 * | 3/2011 | Kubota .............. H04N 13/0003 348/52 |
| 2011/0115806 | A1 | 5/2011 | Rogers |
| 2011/0168475 | A1 * | 7/2011 | Moser ..................... B60R 21/01 180/271 |

(Continued)

*Primary Examiner* — Amara Abdi
(74) *Attorney, Agent, or Firm* — Sheppard Mullin Richter & Hampton LLP (57) ABSTRACT

This disclosure relates to generating stereographic projection content. Stereographic projection content may be generated by obtaining visual information defining visual content. The visual information may be analyzed to determine one or more visual characteristics for the visual content. One or more visual characteristics may indicate a degree of matching visuals within the visual content. One or more visual criteria may be obtained. One or more visual criteria may define a minimum degree of matching visuals within the visual content for a stereographic projection transformation. One or more visual characteristics may be compared with one or more visual criteria to determine whether at least a portion of the visual content is suitable for stereographic projection transformation. Based on one or more visual characteristics satisfying one or more visual criteria, at least the portion of the visual content may be transformed using stereographic projection.

20 Claims, 4 Drawing Sheets

(56) References Cited

U.S. PATENT DOCUMENTS

| | | |
|---|---|---|
| 2011/0249001 A1 | 10/2011 | Kameyama |
| 2011/0255802 A1 | 10/2011 | Kameyama |
| 2013/0013185 A1* | 1/2013 | Smitherman ........ G01C 11/025 |
| | | 701/409 |
| 2013/0100132 A1* | 4/2013 | Katayama .......... H04N 13/0022 |
| | | 345/420 |
| 2015/0173715 A1* | 6/2015 | Raghavan ................ A61B 8/46 |
| | | 600/440 |

\* cited by examiner

SYSTEMS AND METHODS FOR GENERATING STEREOGRAPHIC PROJECTION CONTENT

FIELD

This disclosure relates to systems and methods that generate stereographic projection content.

BACKGROUND

Image/video applications may allow a user to view a particular image/video using stereographic projection. Image/video applications do not suggest particular image/video or particular portions of image/video for viewing using stereographic projection. Finding images/videos suitable for viewing using stereographic projection may be time consuming and may discourage users from using stereographic projection.

SUMMARY

This disclosure relates to generating stereographic projection content. Stereographic projection content may be generated by obtaining visual information defining visual content. The visual information may be analyzed to determine one or more visual characteristics for the visual content. One or more visual characteristics may indicate a degree of matching visuals within the visual content. One or more visual criteria may be obtained. One or more visual criteria may define a minimum degree of matching visuals within the visual content for a stereographic projection transformation. One or more visual characteristics may be compared with one or more visual criteria to determine whether at least a portion of the visual content is suitable for stereographic projection transformation. Based on one or more visual characteristics satisfying one or more visual criteria, at least the portion of the visual content may be transformed using stereographic projection.

A system that generates stereographic projection content may include one or more of physical processors and/or other components. The physical processor(s) may be configured by machine-readable instructions. Executing the machine-readable instructions may cause the physical processor(s) to facilitate generating stereographic projection content. The machine-readable instructions may include one or more computer program components. The computer program components may include one or more of a visual information component, a visual characteristic component, a visual criteria component, a comparison component, a transformation component, and/or other computer program components.

The visual information component may be configured to obtain visual information defining visual content. Visual content may refer to media content that may be observed visually. Visual content may be captured at a time or at different times. Visual content may be captured by an image sensor or multiple image sensors. Visual content may include one or more of an image, a sequence of images, a frame of a video, a video, and/or other visual content. Visual content may include 360 degrees or less than 360 degrees capture of visual at a location.

The visual characteristic component may be configured to analyze the visual information to determine one or more visual characteristics for the visual content. One or more visual characteristics may indicate a degree of matching visuals within the visual content. One or more visual characteristics may include a first visual characteristic and/or other visual characteristics for the visual content.

In some implementations, a degree of matching visuals within the visual content may include a degree of matching visuals between opposing edges of the visual content. In some implementations, a degree of matching visuals between opposing edges of the visual content may include a degree of a horizontal split within the visual content.

In some implementations, a degree of matching visuals within the visual content may include a degree of uniformity within the visual content. A degree of uniformity within the visual content may include a degree of uniformity within one or both of a top part and/or a bottom part of the visual content. A degree of uniformity within the visual content may include a degree of color difference between opposing parts of the visual content. A degree of uniformity within the visual content may include a degree of contrast difference between opposing parts of the visual content.

The visual criteria component may be configured to obtain one or more visual criteria. One or more visual criteria may define a minimum degree of matching visuals within the visual content for a stereographic projection transformation. One or more visual criteria may include a first visual criterion and/or other visual criteria. In some implementations, one or more visual criteria may be obtained based on user input.

The comparison component may be configured to determine whether at least a portion of the visual content is suitable for stereographic projection transformation. The comparison component may make such determination by comparing one or more visual characteristics with one or more visual criteria. Such comparison may include a comparison of the first visual characteristic with the first visual criterion, and/or other comparisons.

The transformation component may be configured to transform at least the portion of the visual content using stereographic projection. Such transformation may be based on one or more visual characteristics satisfying one or more visual criteria. In some implementations, the transformation component may be configured to effectuate presentation of at least the portion of the visual content on a graphical user interface of an image/video application for a user selection to transform using stereographic projection. The transformation of at least the portion of the visual content using stereographic projection may be further based on the user selection.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
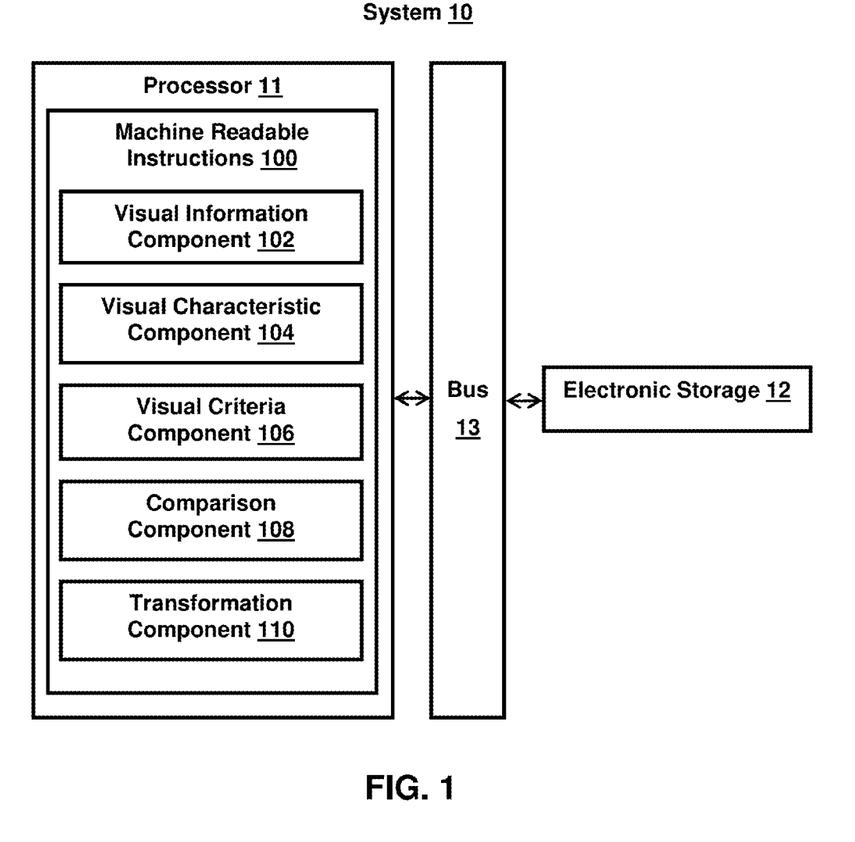
FIG. 1 illustrates a system for generating stereographic projection content.

FIG. 1 illustrates system 10 for generating stereographic projection content. System 10 may include one or more of processor 11, electronic storage 12, bus 13, and/or other components. Stereographic projection content may be generated by obtaining visual information defining visual content. The visual information may be analyzed to determine one or more visual characteristics for the visual content. One or more visual characteristics may indicate a degree of matching visuals within the visual content. One or more visual criteria may be obtained. One or more visual criteria may define a minimum degree of matching visuals within the visual content for a stereographic projection transformation. One or more visual characteristics may be compared with one or more visual criteria to determine whether at least a portion of the visual content is suitable for stereographic projection transformation. Based on one or more visual characteristics satisfying one or more visual criteria, at least the portion of the visual content may be transformed using stereographic projection.

Electronic storage 12 may include electronic storage media that electronically stores information. Electronic storage 12 may store software algorithms, information determined by processor 11, information received remotely, and/or other information that enables system 10 to function properly. For example, electronic storage 12 may store information relating to visual content, visual characteristics, visual criteria, stereographic projection transformation, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate generation of stereographic projection content. Machine readable instructions 100 may include one or more of visual information component 102, visual characteristic component 104, visual criteria component 106, comparison component 108, transformation component 110, and/or other computer program components.

Visual information component 102 may be configured to obtain visual information defining visual content. Visual content may refer to media content that may be observed visually. Visual content may be captured at a time or at different times. Visual content may be captured by an image sensor or multiple image sensors. Visual content may include one or more of an image, a sequence of images, a frame of a video, a video, and/or other visual content. Visual content may include 360 degrees or less than 360 degrees capture of visual at a location. 360-degrees visual content may be obtained by a spherical capture through use of one or more cameras/image sensors. For example, 360-degrees visual content may be captured by using multiple cameras/image sensors to capture images/video from a location and stitching the images/videos together.

Visual information component 102 may obtain visual information defining visual content during acquisition of the visual content or after acquisition of the visual content. For example, visual information component may obtain visual information defining visual content while the visual content is being captured by one or more cameras/image sensors. Visual information component 102 may obtain visual information defining visual content after the visual content has been captured and stored in memory (e.g., electronic storage 12, etc.).

Visual characteristic component 104 may be configured to analyze the visual information to determine one or more visual characteristics for the visual content. One or more visual characteristics may indicate a degree of matching visuals within the visual content. One or more visual characteristics may include a first visual characteristic and/or other visual characteristics for the visual content.

A degree of matching visuals within visual content may indicate the extent to which one or more apparent mismatches may appear in stereographic projection view of the visual content. A mismatch may refer to a break in apparent continuity of visual content. One or more mismatch may occur in stereographic projection view if opposing edges of visual content that are wrapped around to touch each other in stereographic projection view do not match. A degree of matching visuals within the visual content may include a degree of matching visuals between opposing edges of the visual content. A degree of matching visuals between opposing edges of the visual content may refer to the extent to which one or more apparent mismatches may appear at the joined edges when opposing edges of the visual content are joined in stereographic projection view.

Figure 3:
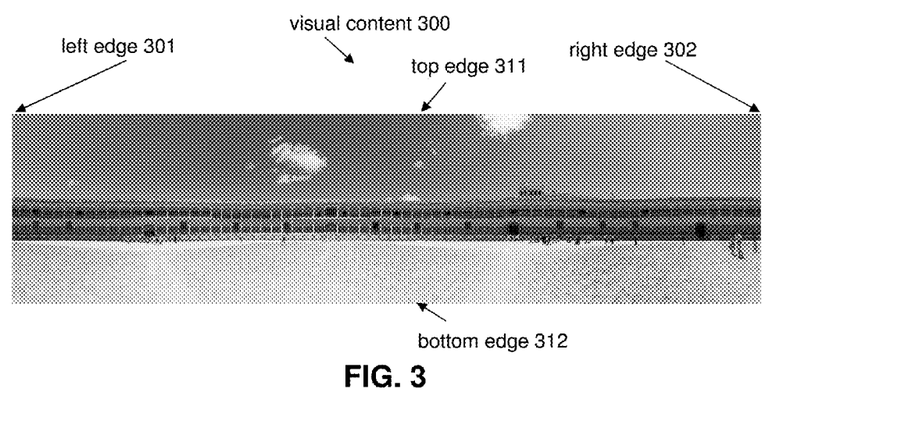
FIG. 3 illustrates an exemplary visual content.
Figure 4:
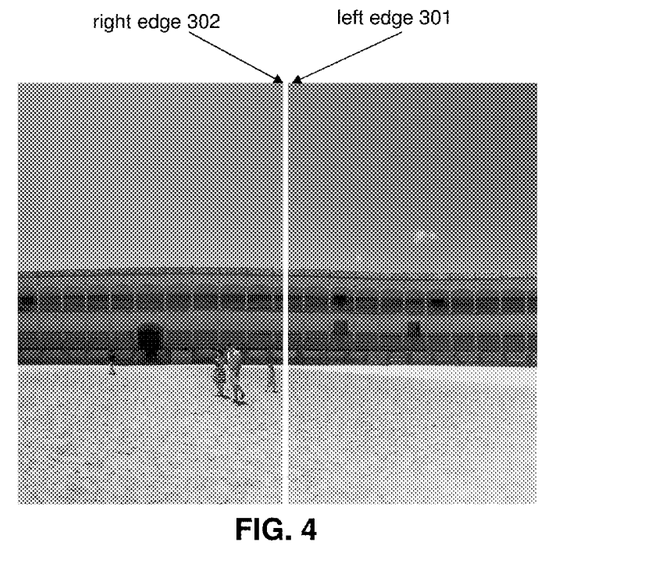
FIG. 4 illustrates an exemplary match between opposing edges of visual content.

Opposing edges of visual content may match for 360-degrees visual content. For example, FIG. 3 illustrates an exemplary visual content 300. Visual content 300 may include 360-degrees visual content at a location. Visual content 300 may be obtained by a spherical capture through use of one or more cameras/image sensors. Visual content 300 may have opposing edges (e.g., left edge 301, right edge 302, etc.). FIG. 4 illustrates an exemplary match between opposing edges 301, 302 of visual content 300. Joining left edge 301 and right edge 302 may create an image that appears to be continuous at joined edges 301, 302 (e.g., no apparent break in continuity of visual content at joined edges 301, 302).

Figure 5:
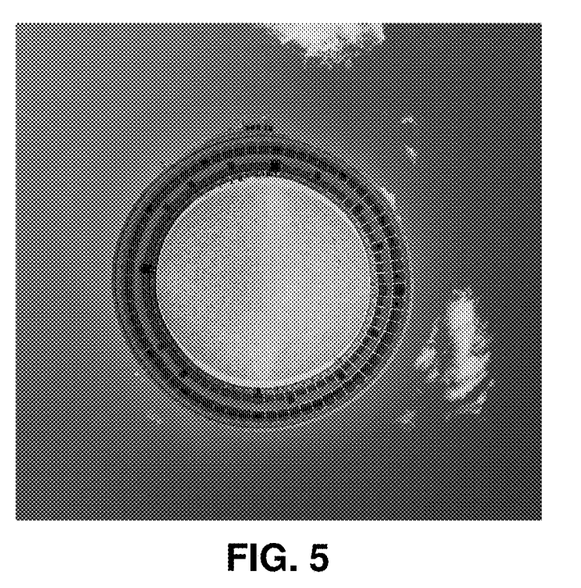
FIGS. 5 and 6 illustrates exemplary stereographic projections of visual content shown in FIG. 3.
Figure 6:
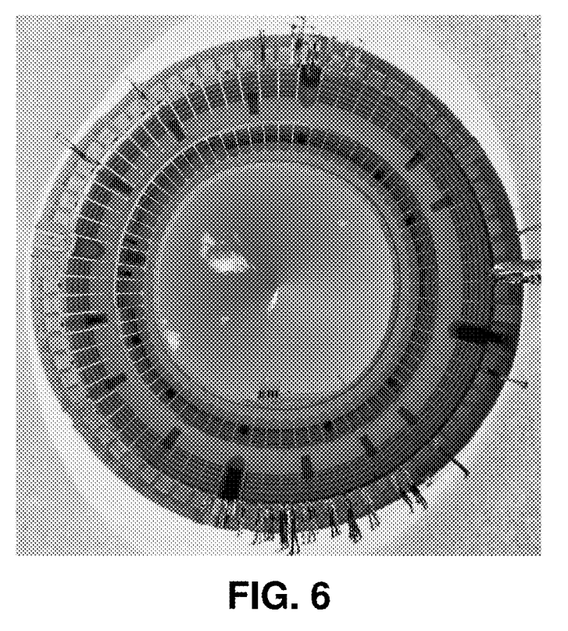

FIGS. 5-6 illustrate non-limiting examples of stereographic projections of visual content 300. In FIG. 5, visual content 300 may be wrapped around a mid-point on bottom edge 312 in the stereographic projection view. Such a view using stereographic projection may be referred to as a little planet view. In the little planet view, the ground part of visual content 300 may appear to be circular (like a planet) and the sky part of visual content 300 may appear to surround the circular ground. The building part of visual content 300 may appear to rise out of the circular ground. In FIG. 6, visual content 300 may be wrapped around a mid-point on top edge 311 in the stereographic projection view. Such a view using stereographic projection may be referred to as a tunnel view. In the tunnel view, the sky part of visual content 300 may appear to be circular (like an end of a tunnel) and the ground/building parts of visual content 300 may appear to surround the circular sky. Other types of stereographic projections (e.g., off-center stereographic projection views, etc.) are contemplated.

Opposing edges of visual content may match for less than 360-degrees visual content. For example, visual content may include less than 360 degrees capture of visual at a location. Less than 360-degrees visual content may be captured so that visuals at opposing edges of the visual content may include matching visuals which may be joined to create a continuous image (i.e., without an apparent break in continuity at the joined edges).

In some implementations, a degree of matching visuals between opposing edges of the visual content may include a degree of a horizontal split within the visual content. A horizontal split within visual content may refer to a color and/or geometrical edge within the visual content that divides the visual content into two parks (e.g., a top part and a bottom part, etc.). For example, in visual content 300, the boundary between the ground and the building may form a horizontal split that divides visual content 300 into a top part (containing the building and the sky) and a bottom part (containing the ground). Other types of horizontal splits are contemplated. A horizontal split within visual content may form part of opposing edges of visual content which may be joined to create a continuous image. If a split within visual content is not horizontal, joining opposing edges of visual content may result in an apparent break in continuity at the joined edges.

A degree of matching visuals within visual content may indicate the extent to which visual content may be viewed using stereographic projection so that distinct bounded areas exist within stereographic projection view of the visual content. The amount/number of bounded areas within stereographic projection view of the visual content may be based on the degree of uniformity within the visual content. A degree of matching visuals within the visual content may include a degree of uniformity within the visual content. A degree of uniformity may refer to a degree of uniformity of one or more of color, contrast, pattern, texture, shapes and/or other visuals within the visual content.

A degree of uniformity within visual content may include a degree of uniformity within one or more parts of the visual content. For example, a degree of uniformity within visual content may include a degree of uniformity within one or more of a top part, a bottom part, and/or other parts of the visual content. A degree of uniformity within visual content may include a degree of color difference between one or more parts of the visual content. For example, a degree of uniformity within visual content may include a degree of color difference between opposing parts of the visual content. A degree of uniformity within visual content may include a degree of contrast difference between one or more parts of the visual content. For example, a degree of uniformity within visual content may include a degree of contrast difference between opposing parts of the visual content.

For example, in FIG. 3, visual content 300 may include a bottom part (containing the ground), a middle part (containing the building), a top part (containing the sky), and/or other parts. The bottom part may include a greater degree of uniformity than the middle part or the top part. The top part may contain a greater degree of uniformity than the middle part. Visual content 300 may include a degree of color difference between top part and bottom part, between top part and middle part, and between middle part and bottom part. Visual content 300 may include a degree of contrast difference between top part and bottom part, between top part and middle part, and between middle part and bottom part.

In some implementations, one or more visual characteristics may indicate an aspect ratio of the visual content. An aspect ratio of visual content may define a ratio of the width of the visual content to the height of the visual content (e.g., in equirectangular projection view, etc.). For example, visual content 300 may have an aspect ratio of 4:1 (i.e., the width of visual content 300 is four times the height of visual content 300).

Visual criteria component 106 may be configured to obtain one or more visual criteria. One or more visual criteria may include a first visual criterion and/or other visual criteria. One or more visual criteria may define a minimum degree of matching visuals within the visual content for a stereographic projection transformation. One or more visual criteria may define a minimum degree of matching visuals within the visual content so that visual content may include a limit on the amount of mismatch in stereographic projection view. For example, one or more visual criteria may define a minimum degree of matching visuals so that opposing edges of the visual content may be joined in stereographic projection view without an apparent break at the joined edges. One or more visual criteria may define a minimum degree of matching visuals so that opposing edges of the visual content may be joined in stereographic projection view with less than (or equal to) a certain amount of apparent breaks at the joined edges. The amount of apparent breaks may refer the number of apparent breaks and/or the extent of apparent breaks.

In some implementations, one or more visual criteria may define a minimum degree of horizontal split within the visual content. For example, one or more visual criteria may define a minimum degree of horizontal split so that a split dividing a top part and a bottom part of the visual content is level. One or more visual criteria may define a minimum degree of horizontal split so that a split dividing a top part and a bottom part of the visual content may deviate from the horizontal by a certain amount. One or more visual criteria may define a minimum degree of horizontal split so that a split dividing a top part and a bottom part of the visual content is level at opposing edges. One or more visual criteria may define a minimum degree of horizontal split so that a split dividing a top part and a bottom part of the visual content may deviate from the horizontal by a certain amount at opposing edges.

One or more visual criteria may define a minimum degree of matching visuals within the visual content so one or more distinct bounded areas exist within stereographic projection view of the visual content. One or more distinct bounded areas may be formed by one or more parts in the visual content that include a degree of uniformity. One or more visual criteria may define a minimum degree of uniformity within one or more parts of the visual content. For example, one or more visual criteria may define a minimum degree of uniformity (e.g., in color, contrast, pattern, texture, shapes, etc.) within a top part (e.g., defined by a split in visual content, defined as top 25% of visual content, etc.), a bottom part (e.g., defined by a split in visual content, defined as bottom 25% of visual content, etc.), and/or other parts within the visual content. For example, one or more visual criteria may define a minimum degree of uniformity within a top part of visual content so that a certain percentage of the top part is composed of a single/similar color. One or more visual criteria may define a minimum degree of uniformity within a bottom part of visual content so that a certain percentage of bottom part is composed of a single pattern/texture or similar pattern/texture.

In some implementations, one or more visual criteria may define an aspect ratio requirement for the visual content. One or more visual criteria may define an aspect ratio so that the visual content is of certain size/shape. For example, one or more visual criteria may require the visual content to have an aspect ratio of at least 2:1. One or more visual criteria may require the visual content to have an aspect ratio less than 2:1. Other aspect ratios are contemplated.

Visual criteria may be programmed into visual criteria component 106, updated by visual criteria component 106, obtained by visual criteria component 106 from electronic storage 12, obtained by visual criteria component 106 from remote location (e.g., a server, a network, etc.), and/or obtained by visual criteria component 106 in other ways.

In some implementations, visual criteria component 106 may be configured to obtain one or more visual criteria based on user input. For example, visual criteria component 106 may obtain visual criteria based on user input received through a graphical user interface of a visual application, a command entered via a keyboard/touchscreen/other hardware, and/or other methods. For example, a graphical user interface may present one or more visual criteria for selection by a user. One or more selection of visual criteria based on user input may be stored to form a user preference for visual criteria.

In some implementations, visual criteria component 106 may be configured to obtain one or more visual criteria based on other visual content. For example, visual criteria component 106 may analyze a group of visual content previously selected (e.g., by a user, based on a user preference, based on analysis of visual content, etc.) for stereographic projection transformation. Visual criteria component 106 may analyze a group of visual content previously rejected (e.g., by a user, based on a user preference, based on analysis of visual content, etc.) for stereographic projection transformation. Visual criteria component 106 may analyze both a group of visual content previously selected and a group of visual content previously rejected for stereographic projection transformation.

Based on the analysis of other visual content, visual criteria component 106 may determine one or more visual criteria. For example, visual criteria component 106 may determine one or more visual criteria that are satisfied by a group of visual content previously selected for stereographic projection transformation and/or not satisfied by a group of visual content previously rejected for stereographic projection transformation. In some implementations, the group of visual content previously selected and/or the group of visual content previously rejected for stereographic projection transformation may be updated/changed (e.g., add new visual content, remove existing visual content, etc.) to change the analysis by visual criteria component 106 to determine one or more visual criteria.

Comparison component 108 may be configured to determine whether at least a portion of the visual content is suitable for stereographic projection transformation. Comparison component 108 may make such determination by comparing one or more visual characteristics with one or more visual criteria. Such comparison may include a comparison of the first visual characteristic with the first visual criterion, and/or other comparisons.

A portion of visual content may refer to one or more parts of the visual content. A portion of visual content may be defined by the extent of the portion and/or by a time/segment corresponding to the portion. For example, visual content may include an image having a certain dimension and a portion of the visual content may include a part of the image having a smaller dimension (e.g., a smaller area within the image, etc.). Visual content may include a video having a certain dimension and a certain duration, and a portion of the visual content may include a part of the video having a smaller dimension and the certain duration (e.g., a smaller area within the video, etc.). Visual content may include a time-lapse images/presentation and a portion of the visual content may include one or more images from the time-lapse images/presentation (e.g., an image from a collection of images, etc.). Visual content may include a video having a certain duration, and a portion of the visual content may include a part of the video having a smaller duration (e.g., a frame or a shorter video clip within the video, etc.).

In some implementations, comparison component 108 may be configured to rank visual content/portions of visual content based on the comparison of one or more visual characteristics with one or more visual criteria. Ranking by comparison component 108 may be based on the number of visual criteria, the differences between the compared visual characteristics, ranking of visual criteria, and/or other information. For example, comparison component 108 may compare multiple visual characteristics of multiple visual content with multiple visual criteria. Comparison component 108 may rank visual content with visual characteristics that satisfy more visual criteria higher than visual content with visual characteristics that satisfy fewer visual criteria.

Comparison component 108 may rank visual content based on the amount by which visual characteristics satisfy visual criteria. For example, visual criteria may include may define a minimum degree of matching visuals so that opposing edges of the visual content may be joined in stereographic projection view with less than (or equal to) a certain amount of apparent breaks at the joined edges. Comparison component 108 may rank visual content with visual characteristics that had less/no breaks at the joined edges higher than visual content with visual characteristics that had more breaks at the joined edges.

Comparison component 108 may rank visual content based on ranking of visual criteria. For example, comparison component 108 may use a first visual criterion and a second visual criterion, with the first visual criterion ranked higher than the second visual criterion. Comparison component 108 may rank video content with visual characteristics that satisfy the first visual criterion higher than video content with visual characteristics that satisfy the second visual criterion. Other types of ranking of video content are contemplated.

Transformation component 110 may be configured to transform at least the portion of the visual content using stereographic projection. Such transformation may be based on one or more visual characteristics satisfying one or more visual criteria. In some implementations, transformation component 110 may be configured to transform at least the portion of the visual content using stereographic projection using systems and/or methods described in U.S. patent application Ser. No. 15/072,238, entitled "SYSTEMS AND METHODS FOR PROVIDING VARIABLE IMAGE PROJECTION FOR SPHERICAL VISUAL CONTENT," filed Mar. 16, 2016, the foregoing being incorporated herein by reference in its entirety. Transformation of one or more portions of visual content may allow a user to share the transformed portion(s) (e.g., via a social network, etc.) rather than sharing the entire visual content.

In some implementations, transformation component 110 may be configured to modify the portion of the visual content to be transformed using stereographic projection. Transformation component 110 may be configured to adjust the extent of the portion of the visual content to be transformed based on the portion of the visual content missing visual information. For example, the visual content may have been captured with less than 180-degrees vertical capture so that a part of the ground is missing from the visual content. The missing visual information may be determined based on visual analysis, analysis of metadata relating to the visual content, and/or based on other information. Transforming the entire portion of the visual content may result in a little planet view with one or more blank spots (e.g., a missing hole in the center of the projection, etc.). Transformation component 110 may adjust the extent of the portion to be transformed so that the missing visual information does not appear in the little planet view.

Transformation component 110 may be configured to change the portion of the visual content to be transformed using stereographic projection. For example, the portion of the visual content to be transformed may be missing visual information in a part of the portion. Transformation component 110 may use blending and/or color fill to fill in the part of the portion that is missing the visual information.

Transformation component 110 may be configured to adjust the rotation of the portion of the visual content to be transformed using stereographic projection. For example, opposing edges of the visual content may be offset by a certain degrees (e.g., the visual content was captured with a camera in a non-horizontal position, etc.). Transformation component 110 may rotate the portion of the visual content to improve the match between opposing edges of the visual content (e.g., rotate an image to improve the match between opposing edges, etc.). Transformation component 110 may be configured to adjust the extent of the rotated portion of the visual content to be transformed so that the transformed portion does not include missing visual information.

In some implementations, transformation component 110 may be configured to select a stereographic projection based on the portion of the visual content. For example, a portion of the visual content may be missing a part of the sky. Based on the missing portion, transformation component 110 may select a little planet view (as opposed to a tunnel view) with viewpoint at zenith so that the missing portion does not appear in the little planet view.

One or more transformed portions of the visual content may be used as a preview for the visual content. For example, transformed portion(s) may include one or more images from a collection of images. The transformed image(s) may be presented on a graphical user interface of an image/video application/hardware as a preview for the collection of images. Transformed portion(s) may include one or more frames within a video clip. The transformed frame(s) may be presented on a graphical user interface of an image/video application/hardware as a preview for the video clip. In some implementations, one or more transformed portions of the visual content used as preview may be of lower resolution than one or more transformed portions of the visual content used for consumption.

One or more transformed portions of the visual content may be incorporated into the visual content. For example, transformed portion(s) may include one or more images from a collection of images. The transformed image(s) may be incorporated into the collection of images as additional image(s) or as replacement image(s) for the one or more images. Transformed portion(s) may include one or more frames within a video clip. The transformed frame(s) may be incorporated into the video clip as additional frame(s) (e.g., providing little planet transitions between segments of the video clip, providing little planet introductions in the video clip, etc.) or as replacement frame(s) for the one or more frames.

Transformation component 110 may transform at least the portion of the visual content using stereographic projection during acquisition of the visual content or after acquisition of the visual content. For example, transformation component 110 may transform at least the portion of the visual content while the visual content is being captured by one or more cameras/image sensors. Visual content transformed using stereographic projection may also be stored using other projections (e.g., equirectangular projection, etc.). Transformation component 110 may transform at least the portion of the visual content after the visual content has been captured and stored in memory (e.g., electronic storage 12, etc.). Visual content using other projections (e.g., equirectangular projection, etc.) may be captured and stored in memory, and transition component 110 may transform at least the portion of the captured/stored visual content.

In some implementations, transformation component 110 may be configured to effectuate presentation of at least the portion of the visual content on a graphical user interface of an image/video application for a user selection to transform using stereographic projection. The transformation of at least the portion of the visual content using stereographic projection may be further based on the user selection.

For example, transformation component 110 may effectuate presentation of one or more visual content (and/or portions of visual content) on the graphical user interface based on the one or more visual content (and/or portions of visual content) having visual characteristics that satisfy visual criteria. One or more visual content (and/or portions of visual content) may be presented using stereographical projection (e.g., a preview of the visual content in one or more stereographic projections, etc.) or using other projections (e.g., equirectangular projection, etc.).

Transformation component 110 may prompt, via the graphical user interface, a user to select one or more visual content (and/or portions of visual content) for transformation using stereographic projection. Responsive to the user's selection of one or more visual content (and/or portions of visual content), transformation component 110 may transform the selected visual content (and/or portions of visual content) using stereographic projection. For example, transformation component 110 may effectuate presentation of a visual content using a stereographic projection transformation of the visual content at low-resolution. Responsive to the user's selection of the visual content, transformation component 110 may transform the selected visual content at full-resolution using stereographic projection.

In some implementations, one or more visual content (and/or portions of visual content) may be presented based on ranking. For example, comparison component 108 may determine that a first visual content and a second visual content are suitable for stereographic projection transformation. Based on the comparison of one or more visual characteristics with one or more visual criteria, comparison component 018 may rank the second visual content higher than the first visual content. Transformation component 110 may prompt a user to select the first visual content and/or the second visual content for transformation using stereographic projection. Transformation component 110 may present the first visual content and/or the second visual content to indicate the higher ranking of the second visual content. For example, the second visual content may be presented before the first visual content. One or more symbols/images may be presented with the second visual content and/or the first visual content to indicate the higher ranking. The second visual content may be presented with more emphasis (e.g., via more vibrant colors, higher contrast, larger size, etc.) than the first visual content.

Although processor 11 and electronic storage 12 are shown to be connected to a bus 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
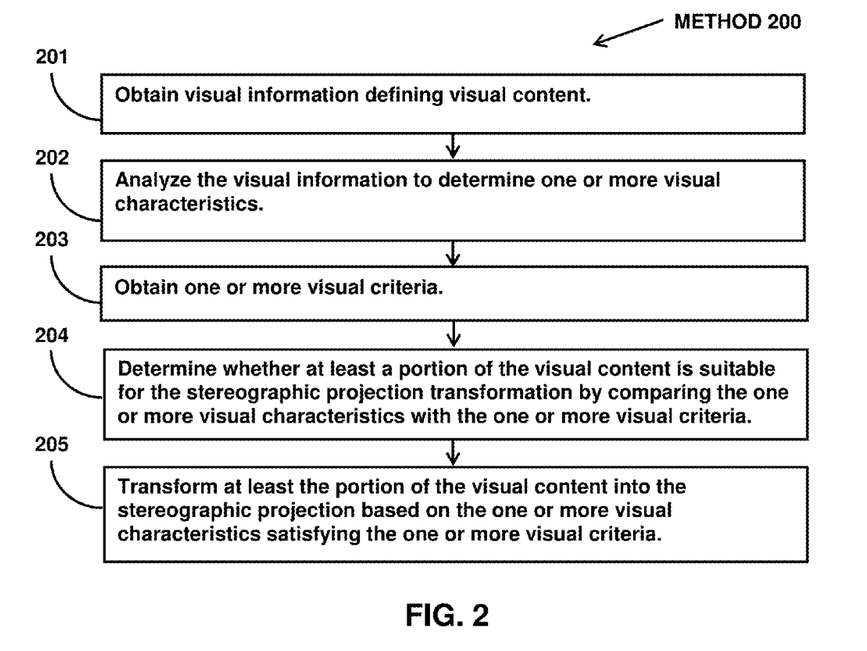
FIG. 2 illustrates a method for generating stereographic projection content.

FIG. 2 illustrates method 200 for generate stereographic projection content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual information defining visual content may be obtained. Visual content may refer to media content that may be observed visually. Visual content may be captured at a time or at different times. Visual content may be captured by an image sensor or multiple image sensors. Visual content may include one or more of an image, a sequence of images, a frame of a video, a video, and/or other visual content. Visual content may include 360 degrees or less than 360 degrees capture of visual at a location. In some implementations, operation 201 may be performed by a processor component the same as or similar to visual information component 102 (shown in FIG. 1 and described herein).

At operation 202, the visual information may be analyzed to determine one or more visual characteristics for the visual content. One or more visual characteristics may indicate a degree of matching visuals within the visual content. One or more visual characteristics may include a first visual characteristic for the visual content. In some implementations, operation 202 may be performed by a processor component the same as or similar to visual characteristic component 104 (shown in FIG. 1 and described herein).

At operation 203, one or more visual criteria may be obtained. One or more visual criteria may define a minimum degree of matching visuals within the visual content for a stereographic projection transformation. One or more visual criteria may include a first visual criterion. In some implementations, operation 203 may be performed by a processor component the same as or similar to visual criteria component 106 (shown in FIG. 1 and described herein).

At operation 204, suitability of at least a portion of the visual content for stereographic projection may be determined by comparing one or more visual characteristics with one or more visual criteria. Such comparison may include a comparison of the first visual characteristic with the first visual criterion. In some implementations, operation 204 may be performed by a processor component the same as or similar to comparison component 108 (shown in FIG. 1 and described herein).

At operation 205, at least the portion of the visual content may be transformed using stereographic projection based on one or more visual characteristics satisfying one or more visual criteria. In some implementations, operation 205 may be performed by a processor component the same as or transformation component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating stereographic projection content, the system comprising:
    one or more physical processors configured by machine readable instructions to:
        obtain visual information defining visual content;
        analyze the visual information to determine one or more visual characteristics for the visual content, the one or more visual characteristics indicating a degree of matching visuals within the visual content, the one or more visual characteristics including a first visual characteristic for the visual content;
        obtain one or more visual criteria, the one or more visual criteria defining a minimum degree of matching visuals within the visual content for a stereographic projection transformation, the one or more visual criteria including a first visual criterion;
        determine whether at least a portion of the visual content is suitable for the stereographic projection transformation by comparing the one or more visual characteristics with the one or more visual criteria, such comparison including a comparison of the first visual characteristic with the first visual criterion;
        transform at least the portion of the visual content using the stereographic projection based on the one or more visual characteristics satisfying the one or more visual criteria.

2. The system of claim 1, wherein the visual content includes one or both of an image and/or a video.

3. The system of claim 1, wherein the degree of matching visuals within the visual content includes a degree of matching visuals between opposing edges of the visual content.

4. The system of claim 3, wherein the degree of matching visuals between opposing edges of the visual content includes a degree of a horizontal split within the visual content.

5. The system of claim 1, wherein the degree of matching visuals within the visual content includes a degree of uniformity within the visual content.

6. The system of claim 5, wherein the degree of uniformity within the visual content includes a degree of uniformity within one or both of a top part and/or a bottom part of the visual content.

7. The system of claim 6, wherein the degree of uniformity within the visual content further includes a degree of color difference between opposing parts of the visual content.

8. The system of claim 6, wherein the degree of uniformity within the visual content further includes a degree of contrast difference between opposing parts of the visual content.

9. The system of claim 1, wherein the one or more visual criteria is obtained based on a user input.

10. The system of claim 1, wherein the one or more physical processors are further configured to effectuate presentation of at least the portion of the visual content on a graphical user interface for a user selection to transform using the stereographic projection, and the transformation of at least the portion of the visual content using the stereographic projection is further based on the user selection.

11. A method for generating stereographic projection content, the method comprising:
    obtaining visual information defining visual content;
    analyzing the visual information to determine one or more visual characteristics for the visual content, the one or more visual characteristics indicating a degree of matching visuals within the visual content, the one or more visual characteristics including a first visual characteristic for the visual content;
    obtaining one or more visual criteria, the one or more visual criteria defining a minimum degree of matching visuals within the visual content for a stereographic projection transformation, the one or more visual criteria including a first visual criterion;
    determining whether at least a portion of the visual content is suitable for the stereographic projection transformation by comparing the one or more visual characteristics with the one or more visual criteria, such comparison including a comparison of the first visual characteristic with the first visual criterion;
    transforming at least the portion of the visual content using the stereographic projection based on the one or more visual characteristics satisfying the one or more visual criteria.

12. The method of claim 11, wherein the visual content includes one or both of an image and/or a video.

13. The method of claim 11, wherein the degree of matching visuals within the visual content includes a degree of matching visuals between opposing edges of the visual content.

14. The method of claim 13, wherein the degree of matching visuals between opposing edges of the visual content includes a degree of a horizontal split within the visual content.

15. The method of claim 11, wherein the degree of matching visuals within the visual content includes a degree of uniformity within the visual content.

16. The method of claim 15, wherein the degree of uniformity within the visual content includes a degree of uniformity within one or both of a top part and/or a bottom part of the visual content.

17. The method of claim 16, wherein the degree of uniformity within the visual content further includes a degree of color difference between opposing parts of the visual content.

18. The method of claim 16, wherein the degree of uniformity within the visual content further includes a degree of contrast difference between opposing parts of the visual content.

19. The method of claim 11, wherein the one or more visual criteria is obtained based on a user input.

20. The method of claim 11, further comprising effectuate presentation of at least the portion of the visual content on a graphical user interface of for a user selection to transform using the stereographic projection, wherein the transformation of at least the portion of the visual content using the stereographic projection is further based on the user selection.

* * * * *